United States Patent [19]

Graas et al.

[11] Patent Number: 5,135,038

[45] Date of Patent: Aug. 4, 1992

[54] TIRE TREADS

[75] Inventors: Maurice Graas, Reichlange; Hendrikus J. L. M. De Wit, Colmar-Berg, both of Luxembourg

[73] Assignee: The Goodyear Tire & Rubber Company, Akron, Ohio

[21] Appl. No.: 607,964

[22] Filed: Nov. 1, 1990

[30] Foreign Application Priority Data

Jul. 20, 1990 [EP] European Pat. Off. ........ 90630131.2

[51] Int. Cl.$^5$ ............................................. B60C 11/08
[52] U.S. Cl. .......................... 152/209 R; 152/DIG. 3
[58] Field of Search ...................... 152/209 R, 209 D; D12/146, 147

[56] References Cited

U.S. PATENT DOCUMENTS

| D. 287,708 | 1/1987 | Hayakawa | D12/147 |
|---|---|---|---|
| D. 315,128 | 3/1991 | Grass et al. | D12/147 |
| D. 315,129 | 3/1991 | Graas et al. | D12/147 |
| 3,841,372 | 10/1974 | Boileau | 152/209 R |

FOREIGN PATENT DOCUMENTS

| 0325905 | 12/1988 | European Pat. Off. | |
| 3424796 | 1/1985 | Fed. Rep. of Germany . | |
| 3445041 | 6/1986 | Fed. Rep. of Germany . | |
| 0017505 | 6/1988 | France . | |
| 0017738 | 6/1988 | France . | |
| 0012072 | 5/1986 | Japan . | |
| 0028740 | 6/1988 | Japan . | |
| 0022425 | 7/1988 | Japan . | |
| 0036506 | 2/1989 | Japan | 152/209 R |
| 0036507 | 2/1989 | Japan | 152/209 D |
| 0309806 | 12/1989 | Japan | 152/209 D |
| 1036216 | 8/1986 | United Kingdom . | |
| 1041393 | 4/1987 | United Kingdom . | |
| 2195107 | 3/1988 | United Kingdom . | |

OTHER PUBLICATIONS

Patent Abstracts of Japan, vol. 13, No. 247 (M-835) [3595] 8th Jun. 1989; JP-A-64 56206 (Bridgestone Corp.) Mar. 3, 1989.
Patent Abstracts of Japan, vol. 12, No. 302 (M-732) [3149] Aug. 17, 1988, JP-A-6378805 (Bridgestone Corp.) Aug. 4, 1988.

*Primary Examiner*—John J. Gallagher
*Assistant Examiner*—Nancy T. Krawczyk
*Attorney, Agent, or Firm*—T. P. Lewandowski

[57] ABSTRACT

The tire treads (11) comprise an uneven number of axially spaced straight grooves (400–404) which extend circumferentially about the tire (10), the center groove (402) having its centerline on the equatorial plane (EP), and a plurality of circumferentially spaced laterally extending grooves (430–435), the axially innermost grooves (431–434) forming with the equatorial plane an angle comprised between 30° and 60°, the two axially outermost grooves (430, 435) forming with the equatorial plane an angle comprised between 60° and 80°. The circumferentially and laterally extending grooves define rows of land portions having the shape of a large parallelogram adjacent to a small parallelogram. The small parallelogram has one of his small sides in the continuation of one of the sides of the large parallelogram delimiting a circumferentially extending groove (400–404). The length of the small side of the small parallelogram is changed in order to modify the performance characteristics of the tire.

13 Claims, 6 Drawing Sheets

TIRE TREADS

The present invention relates to tire treads as well as to pneumatic radial tires including such a tread. The tread portion of a pneumatic tire generally comprises a plurality of grooves defining ground engaging elastomeric elements. The particular size, shape and relative positioning of these elements contribute significantly to the overall performance of the tire.

The invention relates more specifically to treads and tires intended for use on high performance vehicles such as high powered motorcars. A "high performance" tire is a tire which has a speed rating of V or Z; a speed rating of V, respectively Z means that the tire can be safely run to speeds up to 240 km per hour, respectively over 240 km per hour.

Prior art high performance tires, such as the tires described in commonly owned U.S. Pat. application No. 363,811 filed on Jun. 9, 1989, have often directional designs in order to provide good handling response as well as a good performance on wet surfaces. Directional tires have however higher design and manufacturing costs. Furthermore a tire having a directional design, once fitted on its rim, can only be mounted on a vehicle such that it rotates in the required direction on one side of the vehicle only.

The aim of the invention is to create a non-directional tread for a high performance tire.

A further aim of the invention is to provide a tire having a low noise emission and excellent wet traction.

A still further aim of the invention is to provide a pneumatic tire behaving in a uniform manner, irrespective of the road surface conditions.

These aims are met by the tire tread as described in the appended claims and a non-directional tire tread for a tire made of an elastomeric substance and extending circumferentially about the axis of rotation of the tire. The tread has a pair of lateral edges and an uneven number of axially spaced straight multiple grooves therein which extend circumferentially about the tire as depicted by the drawings. A middle groove has its centerline on an equatorial plane of the tire. A plurality of circumferentially spaced laterally extending straight grooves form with the equatorial plane an angle between 30° and 60°, all the grooves being parallel to one another, with the exception of the axially outermost laterally extending grooves which have less inclination than the other grooves and form with the equatorial plane an angle comprised between 60° and 80°. The circumferentially and laterally extending grooves defining at least two rows of circumferentially extending elastomeric land portions, one row on each side of the equatorial plane and offset from the row adjacent it in the circumferential direction. The land portions have the shape of a large parallelogram attached to a single small parallelogram, the small parallelogram having one of its small sides in the continuation of one of the sides of the large parallelogram which is bordering a circumferentially extending groove and one of its large sides coincident with one of the sides of the large parallelogram over a distance ranging between 30% and 70% of the length of the side of the large parallelogram. The small parallelogram being on the opposite side of the large parallelogram from the large parallelogram on the other side of the equatorial plane to thus form a non-directional pattern. The invention also includes axially equally spaced land portions on each side with respect to the equatorial plane which have a length of the small side of the small parallelogram ranging between 20% and 50% of the width of the laterally extending groove portion adjacent the small parallelogram and, alternately, between 50% and 80%. Further, the small side of the small parallelogram may have a length of at most 1% of the tread width.

The acquaint persons skilled in the art most closely related to the instant invention, certain preferred embodiments are now described with reference to the annexed drawings. These embodiments are illustrative and can be modified in numerous ways within the spirit and scope of the invention defined in the claims.

For the purpose of this invention, a pneumatic radial tire shall be considered a tire wherein the cords of the carcass reinforcement which extend from bead to bead are laid at cord angles in the range of 75° to 90° with respect to the equatorial plane (EP) of the tire. As used herein and in the claims, an "equatorial plane" means a plane perpendicular to a tire's axis of rotation and passing through the center of its tread, midway between the sidewalls of the tire. The terms "radial" and "radially" are understood to refer to directions that are perpendicular to the axis of rotation of a tire, the terms "axial" and "axially" are used herein to refer to lines or directions that are parallel to the axis of rotation of a tire and the terms "lateral" and "laterally" are understood to refer to directions going from one sidewall of a tire towards the other sidewall of a tire. "Groove" means an elongated void area in a tread that may extend circumferentially or laterally in the tread in a straight or slightly curved manner. A "sipe" is a groove having a width from 0.2 to 1% of the treadwidth. The different grooves have, unless specified otherwise, substantially the same depth. "Tread width" (TW) is defined as the greatest axial distance across a tread, when measured from a footprint of a tire, when mounted on the design rim and subjected to a specified load and when inflated to a specified inflation pressure for said load. Axial widths and other widths of other tread features or components are measured under the same condition as the tread width.

It is, to be understood that the invention applies to new tires, to retreaded tires as well as to tire treads in strip form, being at least partly vulcanized and having a pattern of grooves and raised elements integral therewith.

Figure 1:
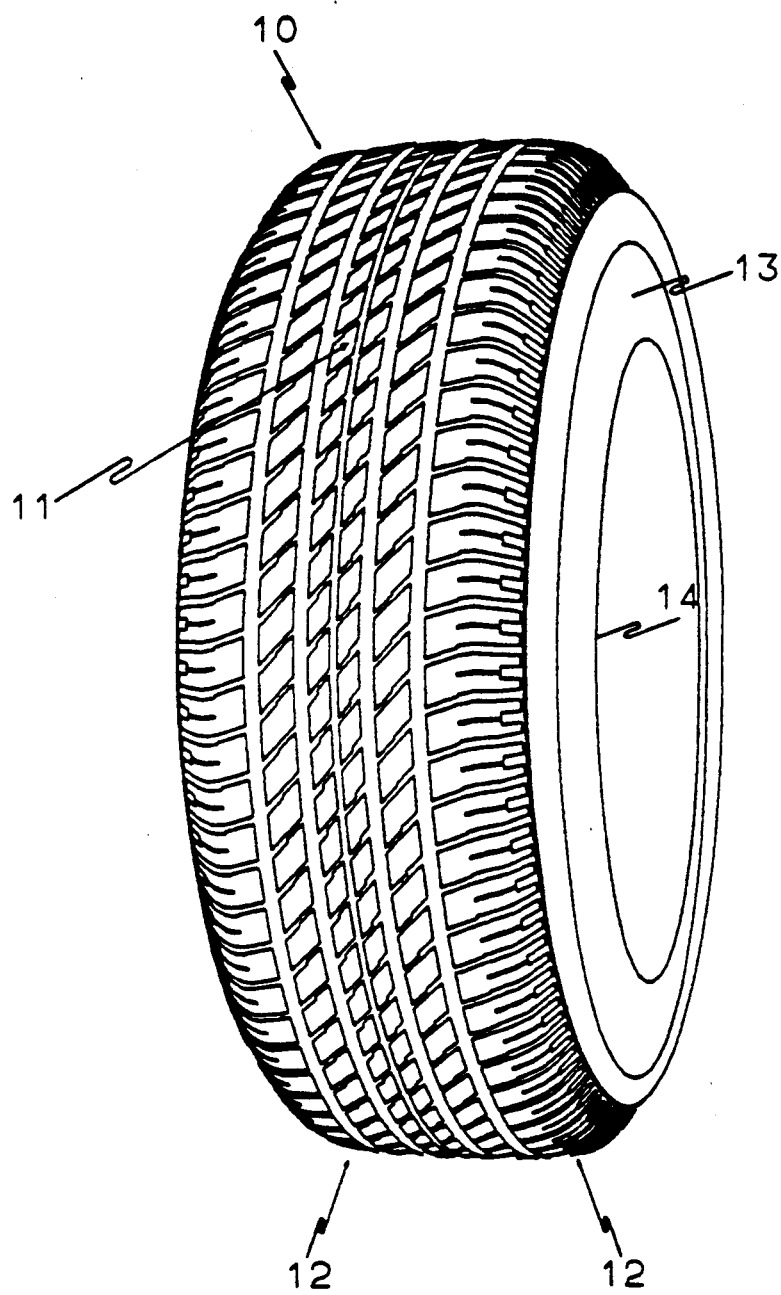
FIG. 1 is a perspective view of a tire embodying a tread made in accordance with the present invention.
Figure 2:
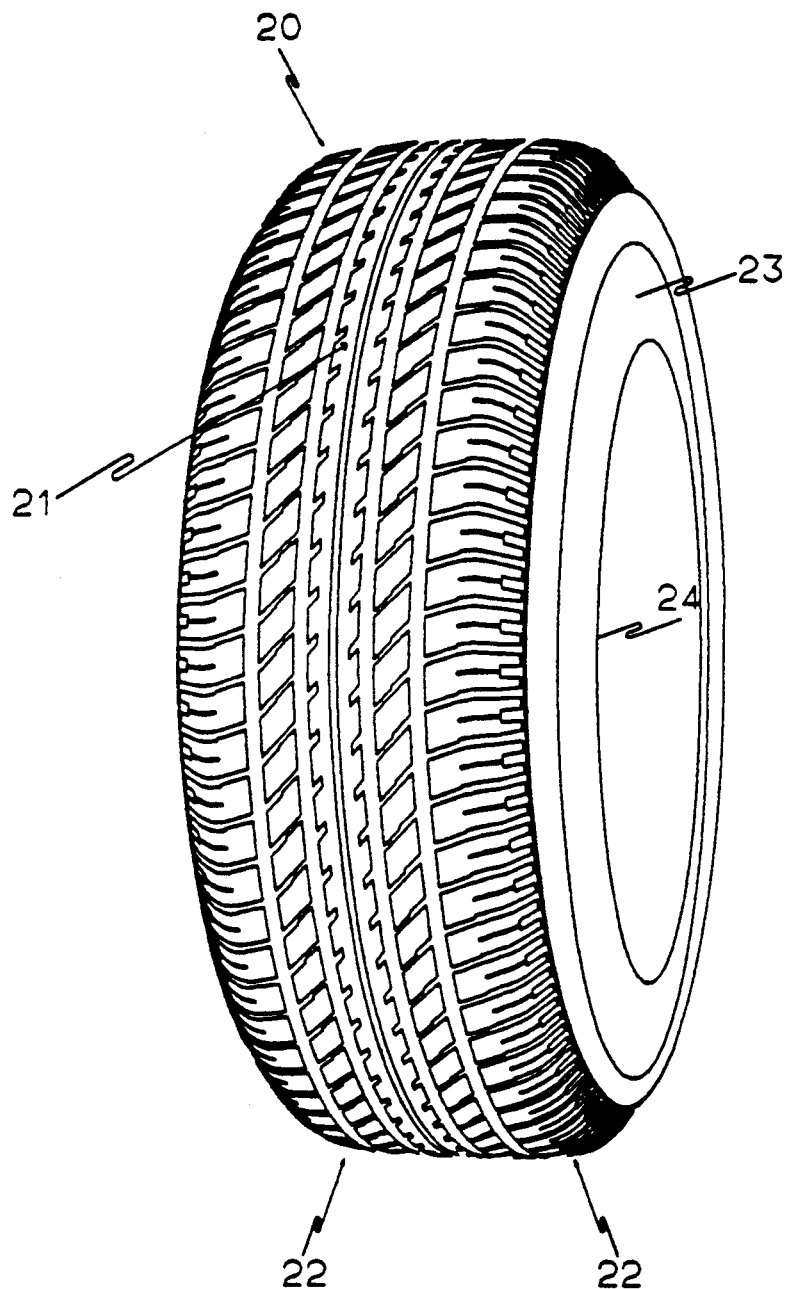
FIGS. 2 and 3 are perspective views of tires embodying treads made in accordance with other embodiments of the present invention.
Figure 3:
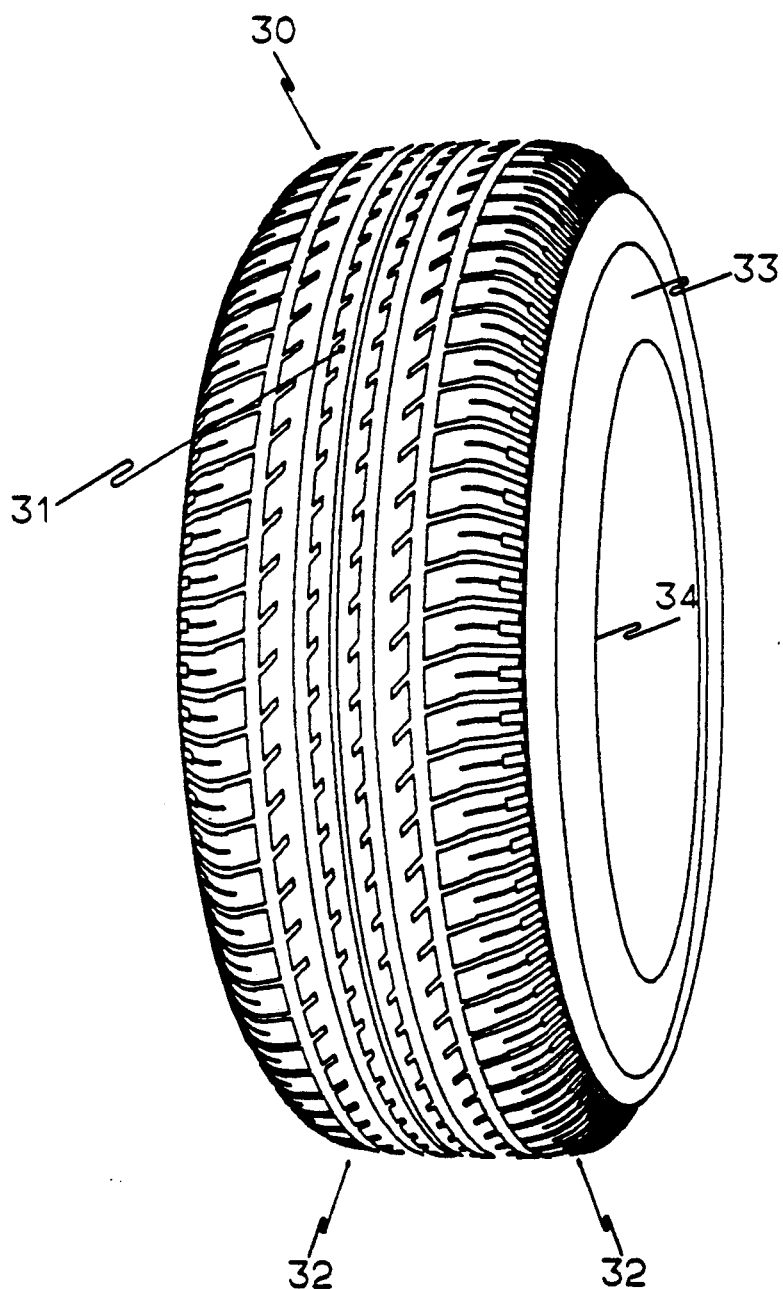

With reference to FIGS. 1, 2 and 3 there are illustrated pneumatic tires 10, 20, 30 of the radial carcass type, having a ground contacting tread 11, 21, 31. The treads are flanked by a pair of shoulders 12, 22, 32 which are in turn joined to a pair of sidewalls 13, 23, 33 that extend radially inwardly from the tread and each terminates in a bead 14, 24, 34.

Figure 4:
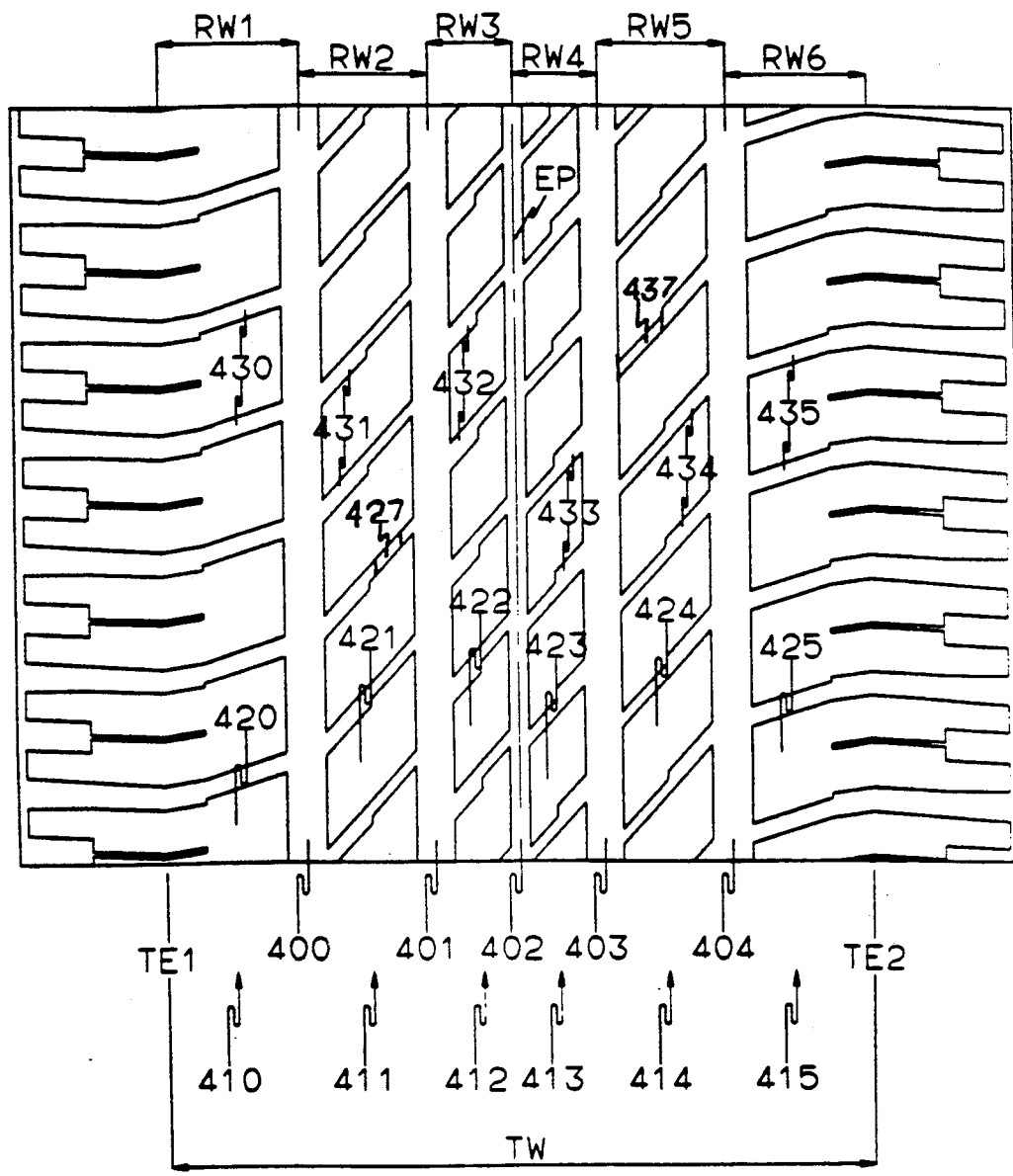
FIG. 4 is an enlarged fragmentary front view of a portion of the tread of FIG. 1.

Referring now more specifically to FIG. 4, there is represented an enlarged fragmentary view of the tread of the tire shown in FIG. 1. The tread 11 has five circumferentially extending straight grooves 400–404 therein, spaced axially apart across the surface of the tread and dividing the tread into six circumferentially extending rows 410–415 (hereafter respectively referred to as central rows 412, 413 intermediate rows 411, 414 and shoulder rows 410, 415) of elastomeric blocks 420–425. As measured in a tire footprint, the axial widths RW3, RW4; RW2, RW5 of the central and intermediate rows, delimited by the axial position of the centerlines of the adjacent circumferentially extending, straight grooves, range respectively from about 10%–15% and 15%–20% of the tread width TW of the ground engaging portion. The central rows 412, 413 have a smaller width than the intermediate rows 411, 414. As measured in a tire footprint, the axial widths RW1, RW6 of the shoulder rows included in the contact patch, range from about 15% to 25% of the tread width. The axially outermost parts of the two shoulder rows of blocks 410, 415 extend past the tread edges TE1, TE2 into the sidewalls 13 and have mainly an appearance or aesthetic function.

A plurality of grooves 430–435 extend laterally across the tread 11. The laterally extending grooves 430–435 are disposed circumferentially about the tire in a repetitive manner, their widths depending on the pitch length variation, as is practiced in the industry for tire noise reduction. BY pitch length is meant the design cycle length of the repetitive tread pattern elements. In the preferred embodiment represented, the laterally extending grooves of the two central rows and the grooves of the adjacent intermediate and shoulder rows have a slight circumferential offset. The grooves of two adjacent center and intermediate rows are circumferentially offset by a distance ranging between 40% and 60% of the distance between two neighboring laterally extending grooves belonging to the same row.

The grooves 430–435 suggest the form of the middle portion of a letter "Z", comprising portions 430, 435 adjacent to the lateral edges $TE_1$, $TE_2$, having a first inclination with respect to the equatorial plane, and intermediate and central portions 431,434; 432,433, having a second inclination with respect to the equatorial plane. The first inclination has a value of about 45° and the second inclination has a value of about 75°. By about is meant a value differing by at most 10% from the indicated value.

The circumferentially and laterally extending grooves 400–404 and 430–435 define circumferentially spaced elastomeric land portions 420–425, having comparable geometric shapes. In the front elevational view shown, the land portions have the shape of a large parallelogram attached to a small parallelogram. Each small parallelogram has a first small side bordering a circumferentially extending groove and a first large side coincident with -and extending about half of- one of the sides of the large parallelograms. The second large side of the small parallelogram defines a portion of the sidewall of a laterally extending groove. The remaining sidewalls of the laterally extending grooves are defined by the sides of an adjacent large parallelogram and the large parallelogram to which the small parallelogram is attached, both large parallelograms belonging to the same row. The other two sides of the large parallelograms are parallel to the equatorial plane and delimit the circumferentially extending grooves 400–404.

It follows that each laterally extending groove has a wide portion and a narrow portion which is diminished by the width of the small side of the small parallelogram. The value of the small side is of importance for the overall behavior of the tire: a low value of the small side leads to excellent wet traction and aquaplaning behavior, whereas a large value -leading to sipes- up to the closing of this portion of the laterally extending groove, results in excellent handling characteristics and lower noise emission.

Apart from changing the value of the small side of the small parallelogram so as to change the width of the narrow portions of the laterally extending grooves, it is also possible to reduce the depth of the narrow portion of the groove, so as to have for instance a depth ranging between 20% and 60% of the depth of the adjacent grooves see as an example groove 437. In an alternate embodiment, small elastomeric bridges, generally known as humps, can be provided in at least part of the narrow portion of the laterally extending grooves see 427.

The wide portions of the laterally extending grooves are situated towards the tread edge nearest to the respective row of blocks. The elastomeric land portions belonging to corresponding rows situated on opposite sides of the equatorial plane are symmetrical with reference to points lying on the equatorial plane.

The circumferentially extending center groove 402 has a width ranging between 2% and 8% of the tread width, whereas the other circumferentially extending grooves have each substantially the same width, ranging between 4% and 10% of the tread width. All of the groove widths are measured perpendicular to the centerline of the groove on the footprint of the tire.

The grooves are arranged on the tread, so that the area of grooves to the area of interposed land portions does not change markedly between the equatorial plane and the tread edges.

It is to be noted that a tread pattern having a groove configuration wherein the laterally extending grooves suggest the form of a letter "S", so as to be the mirror image of the tread represented in FIG. 4, should have substantially the same performances and properties.

Figure 5:
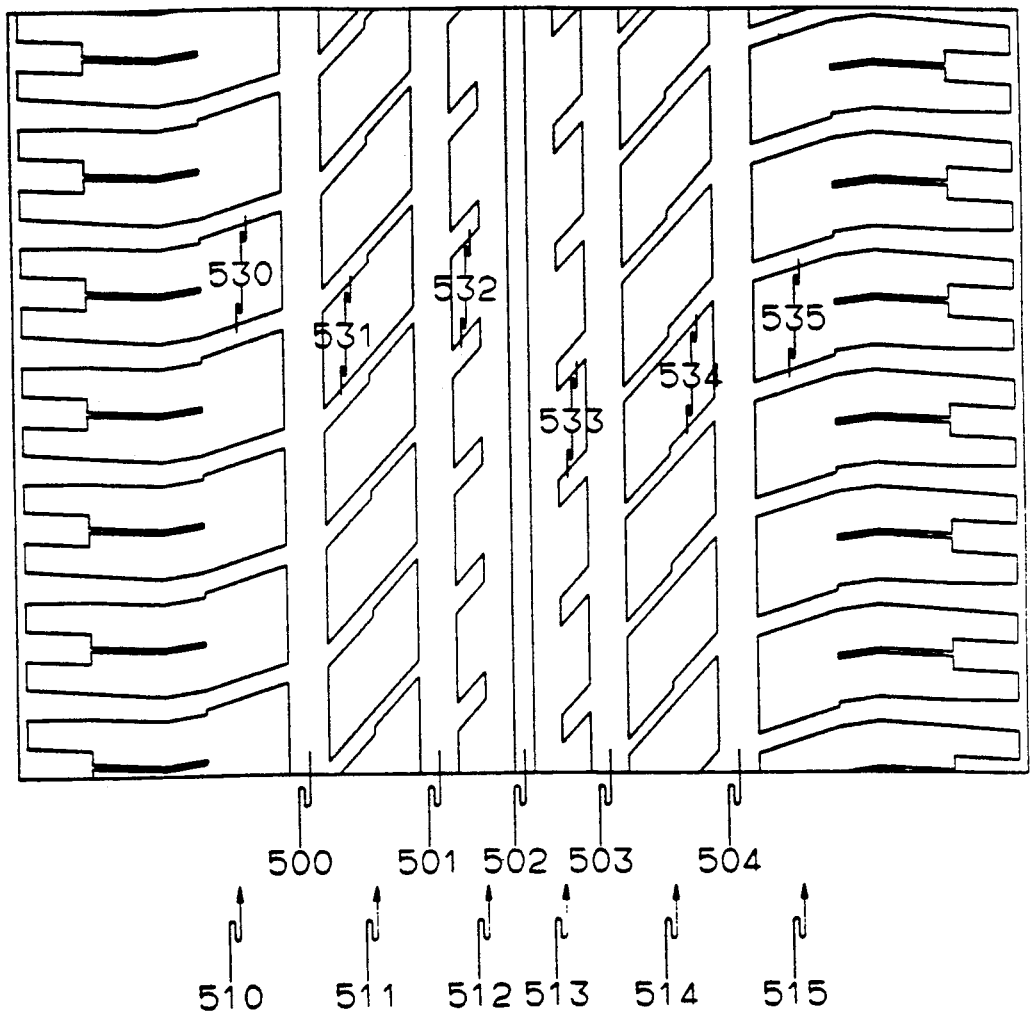
FIGS. 5 and 6 are enlarged fragmentary front views of tread portions according to the embodiments of the invention shown respectively in FIGS. 2 and 3.

In an alternate embodiment of the invention, as illustrated in FIG. 5, the narrow portions of the laterally extending grooves defining the circumferentially extending elastomeric land portions of the center rows 512, 513, have been completely suppressed. The center rows are in fact continuous ribs provided with so called blind grooves 532, 533. These blind grooves are the wide portions of the laterally extending grooves (see reference 432 on FIG. 4). The blind grooves 532, 533 can have throughout their length a uniform depth, equal to the depth of the neighboring circumferentially extending groove, or they can be chamfered towards their blind end. Additional tread parts comparable to those shown in FIG. 4 are also shown in FIG. 5. They bear the same reference number, increased by 100. The tread pattern illustrated in FIG. 5 has improved steering and noise performance as compared to the pattern shown in FIG. 4.

Figure 6:
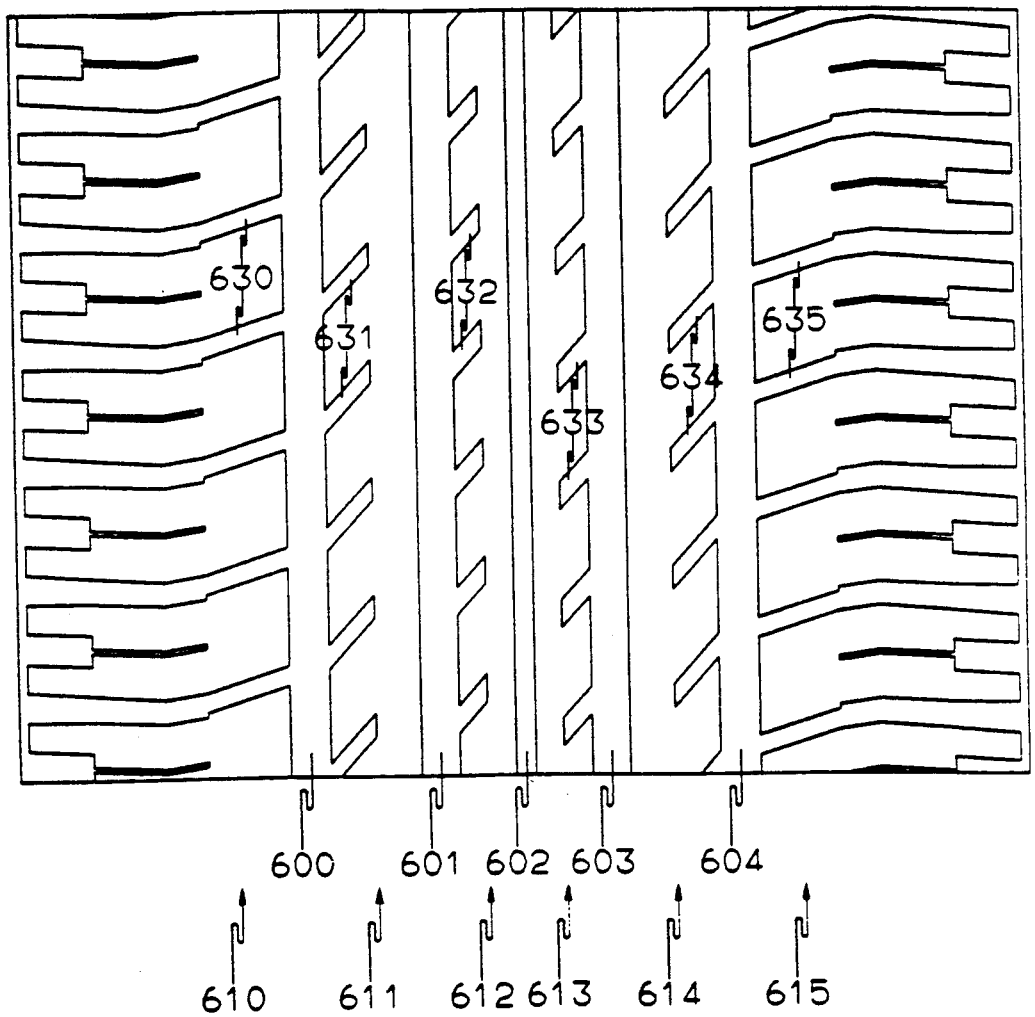

In a still alternate embodiment of the invention, illustrated in FIG. 6, the narrow portions of the laterally extending grooves 630–635 defining the blocks of the center rows and of the intermediate rows have been completely suppressed. Tread parts corresponding to those shown in FIG. 4 bear the same number, increased by 200. Such a tread pattern shows a very low noise emission and has an excellent durability and lateral stability, but poor aquaplaning and traction performance.

The tread structure of the embodiment illustrated in FIG. 6 is mainly of interest for high performance tires having a tread width above 140 mm.

In place of suppressing completely the narrow portions of the laterally extending grooves, these portions can be given a width in the range between 0.2 and 0.8% of the tread width i.e. the width usually given to a sipe. Sipes improve the grip of the tire on low friction surfaces while maintaining the tire's noise performance.

Example: A steel belted radial carcass tire of size 205/60 R 15 has a tread width of about 160 mm and the rows of blocks have axial widths RW1, RW2 and RW3 respectively of about 30, 30 and 20 mm. The grooves have radial depths of about 8.3 mm and their widths depend on the axial position of the different grooves in the tread and they depend also on the pitch value. The laterally extending grooves have widths ranging between about 2 and 4 mm for the narrow portion of the grooves and widths ranging between 3 and 7 mm for the wide portion of the grooves. The central circumferentially extending groove (reference 402 in FIG. 4) has a width ranging between 5 and 8 mm, the intermediate and axially outermost circumferentially extending grooves references 400, 401, 403, 404) have widths ranging between 7 and 12 mm.

The single carcass ply comprises rayon reinforcement cords having a linear density of 1650/3 denier and a fabric density of 25 EPI (ends per inch). The belt structure comprises two single cut plies reinforced by 2×0.30 mm high tensile steel cords, having a cord density of about 24 EPI and forming angles ranging between 22° and 26° with the equatorial plane of the tire, the angles of the cables in different plies opposing each other; and two layers of spirally wound strips reinforced by nylon cords having a linear density of 840/2 denier and a fabric density of 33 EPI.

The tread comprises an elastomeric compound having a modulus ranging between 8 and 12 MPa, a Shore A hardness ranging between 60 and 70, an elongation comprised between 400 to 600% and a tensile strength ranging between 15 and 22 MPa.

While certain representative embodiments have been described for the purpose of illustrating the invention, it will be apparent to those skilled in the art that various changes and modifications may be made therein without departing from the spirit or scope of the invention.

We claim:

1. A non-directional tire tread for a tire made of an elastomeric substance, extending circumferentially about the axis of rotation of the tire and having a pair of lateral edges, said tread having an uneven number of axially spaced straight grooves therein which extend circumferentially about the tire, the middle groove having its centerline on the equatorial plane of the tire, and a plurality of circumferentially spaced laterally extending straight grooves, the grooves forming with the equatorial plane an angle between 30° and 60° and all being parallel to one another, with the exception of the axially outermost laterally extending grooves which form with the equatorial plane an angle between 60° and 80°, the circumferentially and laterally extending grooves defining at least two rows of circumferentially extending elastomeric land portions one row on each side of the equatorial plane and offset from the row adjacent it in the circumferential direction said land portions having the shape of a large parallelogram attached to a single small parallelogram, the small parallelogram having one of its small sides in the continuation of one of the sides of the large parallelogram which is bordering a circumferentially extending groove and one of its large parallelograms over a distance ranging between 30% and 70% of the length of said side of the large parallelogram, said small parallelogram being on the opposite side of the large parallelogram from the small parallelogram on the large parallelogram on the other side of the equatorial plane to thus form a non-directional pattern.

2. A tire tread for a tire according to claim 1 wherein at least two rows of land portions, axially spaced on each side with respect to the equatorial plane, have a length of the small side of the small parallelogram ranging between 20% and 50% of the width of the laterally extending groove portion adjacent the small parallelogram.

3. A tire tread for a tire according to claim 1 wherein at least two rows of land portions, axially spaced on each side with respect to the equatorial plane have a length of the small side of the small parallelogram ranging between 50% and 80% of the width of the laterally extending groove portion adjacent the small parallelogram.

4. A tire tread for a tire according to claim 1 wherein at least two rows of land portions, axially spaced on each side with respect to the equatorial plane, have a length of the small side of the small parallelogram of at most 1% of the tread width.

5. A tire tread for a tire according to claim 2 wherein at least two rows of land portions, axially spaced on each side with respect to the equatorial plane, have a length of the small side of the small parallelogram of at most 1% of the tread width.

6. A tire tread for a tire according to claim 3 wherein at least two rows of land portions, axially spaced on each side with respect to the equatorial plane, have a length of the small side of the small parallelogram of at most 1% of the tread width.

7. A tire tread according to any one of claims 1–6 wherein the laterally and the circumferentially extending grooves have substantially the same depth.

8. A tire tread according to any one of claims 1–6 wherein the circumferentially extending grooves each have the same depth and in that the laterally extending grooves comprise a portion which has a smaller depth than the circumferentially extending grooves.

9. A tire tread according to any one of claims 1–6 wherein the laterally extending grooves comprise humps.

10. A tire tread according to any one of claims 1–6 wherein the axially innermost circumferentially extending land portion on each side of the equatorial plane are continuous ribs provided with blind grooves.

11. A tire tread according to any one of claims 1–6 wherein the two axially innermost circumferentially extending land portions on each side of the equatorial plane are continuous ribs provided with blind grooves.

12. A tire tread according to claim 10 wherein the blind grooves are chamfered.

13. A tire tread according to claim 11 wherein the blind grooves are chamfered.

* * * * *